No. 745,809. Patented December 1, 1903.

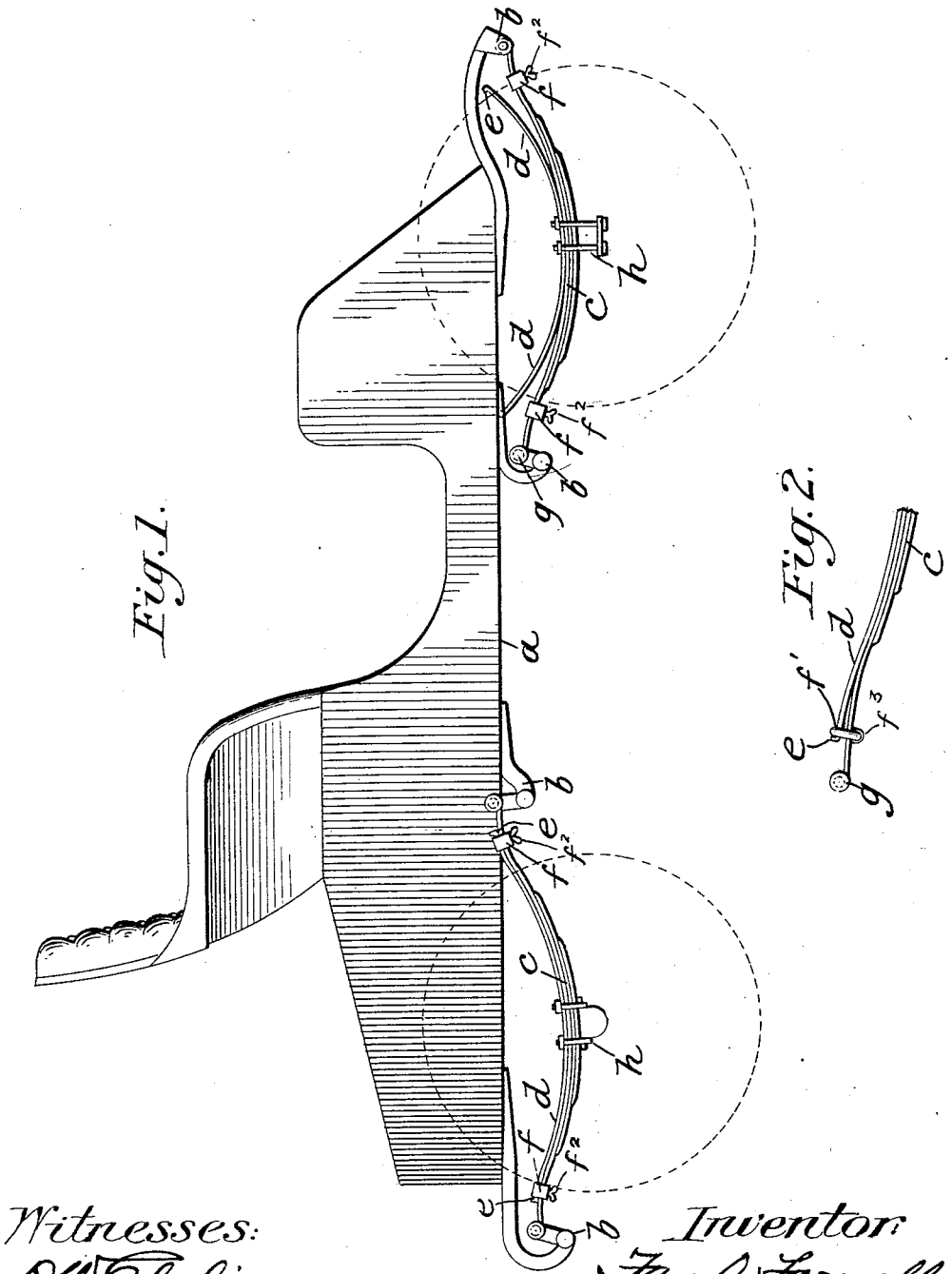

UNITED STATES PATENT OFFICE.

FAY O. FARWELL, OF DUBUQUE, IOWA, ASSIGNOR OF ONE-HALF TO THE ADAMS COMPANY, OF DUBUQUE, IOWA.

VEHICLE-SPRING.

SPECIFICATION forming part of Letters Patent No. 745,809, dated December 1, 1903.

Application filed September 4, 1903. Serial No. 171,936. (No model.)

*To all whom it may concern:*

Be it known that I, FAY O. FARWELL, a citizen of the United States, residing in Dubuque, county of Dubuque, Iowa, have invented certain new and useful Improvements in Vehicle-Springs; and I do hereby declare the following to be a full, clear, and exact description of the invention, such as will enable others skilled in the art to which it appertains to make and use the same.

My invention relates to compound springs for vehicles and the like, and has for its object to provide a compound leaf-spring with means for varying the effective load-supporting power thereof, which means comprise an additional leaf or leaves adapted to be bound to the body of the spring to increase the power of the spring under a heavy load and to be released from coöperative relation with the body of the spring to reduce the power of the spring and render said spring more sensitive or resilient under light loads.

Referring to the accompanying drawings, Figure 1 illustrates a vehicle provided with variable-strength springs embodying my invention. Fig. 2 is a fragmentary detail view of a leaf-spring, showing a modified form of connecting device between the main and auxiliary leaves.

In Fig. 1 of the drawings, $a$ represents the body of a vehicle—for example, a motor-vehicle—which is subjected to varying loads. The body is connected to the running-gear by compound leaf-springs $c$, which are connected at their middle sections to the vehicle-axles by yokes $h$ and at their outer ends by means of eyes $g$ to suitable brackets or hangers $b$ in the manner well known to those skilled in the art. Particular attention is called to the fact that the spring connection thus established between the body and the running-gear of a vehicle is uniform and unvarying in load-supporting power, so that if the springs be constructed to properly support a heavy load and a relatively light load be carried by the vehicle said springs will be too stiff and unyielding to properly respond and afford safe and comfortable riding for the light load. This difficulty is particularly obnoxious in motor-vehicle practice, wherein an ordinary variation in the load on the vehicle is from one to six passengers, and the springs, which are designed to support the maximum load, are altogether too stiff when the vehicle is occupied by one or two passengers. In order to overcome this obvious difficulty and to provide a spring that is readily adaptable to the proper resilient support of the vehicle-body under any condition of load, I construct each of the semi-elliptical compound springs $c$ with one or more auxiliary leaves $d$, which overlie the leaves $c$, forming the body of spring, and are connected at their middle portions with said leaves $c$ in the usual manner. The auxiliary leaves $d$, however, are preferably shorter than the main leaves upon which they are mounted and are so constructed as to tend normally to bend away from the body of the spring when the ends of said leaves are unconfined. When, however, the ends of the auxiliary leaves are bound down and held in contact with the main leaves, it will be apparent that the effective strength of the spring will be augmented by that of the auxiliary leaf or leaves, and, conversely, when the ends of the auxiliary leaves are freed they immediately move away from the body of the spring, and the effective strength of the spring is reduced by an amount equal to that of the auxiliary leaf or leaves.

In order to afford means for quickly connecting the auxiliary leaves to the main leaves, I provide shackles $f\,f$, surrounding the main leaf and adapted to be slipped over ends of the auxiliary leaves $d$ in the manner indicated in connection with the rear spring in Fig. 1. Each shackle is provided with a set-screw $f^2$, by means of which the shackle may be quickly applied to or released from engagement with the ends of the auxiliary leaves. Each end of the auxiliary leaves is preferably provided with a bend or offset $e$ to prevent the shackle working off as the leaves slide upon each other as they expand and contract under load.

In the modification shown in Fig. 2 the shackle $f'$ comprises a simple loop or ring encircling the main leaf, to which it is connected by a suitable eye $f^3$. The loop $f'$ is sufficiently large to pass over the upturned end $e$ of the auxiliary leaf $d$ when the said leaf is depressed and also to permit the auxiliary leaf a proper play as it slides on the main leaf when the spring vibrates.

The mode of operating the invention is exceedingly simple and yet wholly effective of the object sought. If a light load be carried by the vehicle, the shackles $f$ of one or more of the springs $c$ are released by backing out the set-screws $f^2$ and slipping the shackle loops or yokes off of the ends of auxiliary leaves $d$, which ends immediately move away from the main leaves and accordingly reduce the strength of the spring by an amount equal to the power of the respective auxiliary leaves. If the load be increased, the free end of the auxiliary leaves $d$ are bent down into contact with the spring $c$ and shackles $f$ applied to said ends to hold them in close engagement with the body of the spring, to which said auxiliary leaves accordingly lend their aid in supporting the load. In the modified form shown in Fig. 2 the leaf $d$ is bound to or released from contact with the main spring-body by depressing the end of the leaf $d$ until the loop $f^3$ will pass over the upturned end $e$.

It is to be noted that the auxiliary leaves may be applied to the main springs in any desired relation. For example, each spring may have any desired number of auxiliary leaves, and said leaves may be adjustable with respect to one end only, while the other end is permanently secured to the main leaves. The auxiliary leaves may obviously be applied to the vehicle-springs in any desired number or relation and are quite as well adapted to compound leaf-springs of other types than the semi-elliptical form shown. It is also to be noted that each compound spring comprises a unitary structure adapted to be applied to any vehicle interchangeable with the ordinary type of compound leaf-spring without changing or modifying either the vehicle structure of the usual spring-attaching devices on the vehicle.

Having thus described my invention, what I claim is—

1. A compound spring for vehicles and the like consisting of a series of spring components forming a unitary structure, provided with means for increasing or diminishing the effective power of said spring by including or excluding one or more of said spring components in or from active coöperation with the spring structure.

2. A compound spring for vehicles and the like, consisting of a unitary structure comprising a series of coöperating leaves, and means for varying the effective power of said spring by including or excluding one or more of said leaves in or from active coöperation with the spring structure.

3. A compound spring for vehicles and the like, comprising a series of coöperating leaves, one or more of said leaves having ends tending to move away from the body of the spring and thereby diminish the effective power of said spring, and means for binding said ends to the body of the spring to increase the power of said spring.

4. A compound spring for vehicles and the like, comprising a series of coöperating leaves connected together at their middle portions, one or more of said leaves having ends tending to move away from the body of the spring and thereby diminish the effective power of said spring, and means for binding said ends to the body of the spring to increase the power of said spring.

5. A compound spring for vehicles and the like, comprising a series of coöperating leaves, connected together at their middle portions, one or more of said leaves having ends tending to move away from the body of said spring and thereby diminish the effective power of said spring, and shackles adapted to bind said leaf ends to the body of the spring to increase the power of said spring.

6. A compound spring for vehicles and the like, comprising a main leaf or leaves, an additional leaf or leaves connected with but normally inoperative with respect to the other leaves, and means for operatively connecting the additional leaf or leaves to main leaf or leaves to increase the effective power of the spring.

In testimony whereof I affix my signature in presence of two witnesses.

FAY O. FARWELL.

Witnesses:
C. L. BUTLER,
F. A. OATEY.